United States Patent [19]

Itoh et al.

[11] Patent Number: 5,297,114
[45] Date of Patent: Mar. 22, 1994

[54] MAGNETO-OPTIC RECORDING/REPRODUCTION APPARATUS FOR MINIMIZING VARIATION IN FOCUSING ERROR SIGNALS CAUSED BY VARIATION IN OPTICAL SOURCE WAVELENGTH

[75] Inventors: Tsuyoshi Itoh; Isao Okuda; Toshiyuki Kase; Hiroshi Nishikawa; Ryoto Ogawa; Masahiro Oono; Koichi Maruyama; Makoto Iki; Isao Takahashi, all of Tokyo, Japan

[73] Assignee: Asahi Kogaku Kogyo Kabushiki Kaisha, Tokyo, Japan

[21] Appl. No.: 800,846

[22] Filed: Nov. 29, 1991

[30] Foreign Application Priority Data

Nov. 30, 1990 [JP] Japan ................. 2-335934
Mar. 14, 1991 [JP] Japan ................. 3-128867

[51] Int. Cl.$^5$ .................................. G11B 7/00
[52] U.S. Cl. .......................... 369/44.32; 369/44.25; 369/44.29; 369/44.35; 250/201.5
[58] Field of Search ............ 369/44.25, 44.26, 44.35, 369/44.36, 44.34, 44.29, 124, 44.32, 54, 116, 44.11, 121; 250/201.5

[56] References Cited

U.S. PATENT DOCUMENTS

| | | | |
|---|---|---|---|
| 4,748,610 | 5/1988 | Nakata et al. | 369/44.32 |
| 4,881,216 | 11/1989 | Deguchi et al. | 369/54 |
| 4,890,274 | 12/1989 | Kaneko et al. | 369/44.35 |
| 5,084,850 | 1/1992 | Yanagawa et al. | 369/44.23 |
| 5,097,458 | 3/1992 | Suzuki | 369/44.35 |
| 5,099,468 | 3/1992 | Suzuki et al. | 369/44.36 |
| 5,109,367 | 4/1992 | Yoshikawa | 369/44.36 |

FOREIGN PATENT DOCUMENTS 0158038 7/1986 Japan ..................... 369/44.22

OTHER PUBLICATIONS

Isaibovi, Jordan, Videodisc and Optical Memory System, 1985, pp. 113–119.
Pohlmann, Ken C., Principles of Digital Audio, 1985, pp. 236–244.

Primary Examiner—Aristotelis Psitos
Assistant Examiner—Thang V. Tran
Attorney, Agent, or Firm—Sandler Greenblum & Bernstein

[57] ABSTRACT

In the magneto-optic recording/reproduction apparatus, a light beam from a semiconductor laser that can be used with two wavelengths, for recording and reproduction is converged by an objective lens on a magneto-optic disk, a predetermined offset is added to this focusing error signal by an offset adjusting circuit, and the objective lens is driven in the direction of the optical axis based on the focusing error signal to which an offset was added.

7 Claims, 13 Drawing Sheets

MAGNETO-OPTIC RECORDING/REPRODUCTION APPARATUS FOR MINIMIZING VARIATION IN FOCUSING ERROR SIGNALS CAUSED BY VARIATION IN OPTICAL SOURCE WAVELENGTH

BACKGROUND OF THE INVENTION

1. Field of the Invention

This invention concerns a magneto-optic recording/reproduction apparatus for recording information or reproducing recorded information on an optical disk, and in particular concerns a magneto-optic recording/reproduction apparatus wherein a stable focusing servo mechanism can be applied even if the wavelength of the optical source suddenly varies.

2. Description of the Prior Art

In a conventional magneto-optic disk apparatus which can perform recording and reproduction, the light beam from a semiconductor laser is made to converge by an objective lens on a magneto-optic disk so as to record or reproduce a signal.

However, the wavelength of the semiconductor laser shifts when the laser output power varies. As the laser output power used for recording is high and the output power used for reproduction is low, the wavelength shifts instantaneously by several nanometers when a change-over is made from reproduction to recording. If the optical system has a chromatic aberration, therefore, this wavelength shift causes a sudden displacement of the focusing point of the laser beam in the direction of the optic axis. Moreover, the sudden displacement cannot be corrected by a focusing servo mechanism in a quick enough manner.

FIGS. 14-19 show the relation between the displacement of the focusing point due to the wavelength shift and a focusing error signal. In the figures, (1) indicates reproduction, (2) indicates the situation immediately after a change-over is made from reproduction to recording, and (3) indicates recording.

First, the positional relationship between the objective lens and the disk, and the shape of the spot on a photodetector for detecting the focusing error, will be described with reference to FIGS. 14 and 15.

In the following description, the astigmatism method (cylindrical lens method) is used to detect the focusing error signal. In the astigmatism method, a light beam reflected by the disk is given astigmatism by a cylindrical lens, and is received by a photodetector divided into four regions. The focusing error signal is then obtained by summing the outputs from diagonally opposite regions of the photodetector, and taking the difference between the two sums.

During reproduction (long wavelength, low power) or recording (short wavelength, high power), as respectively shown in FIGS. 14(1), (3), the focusing point of the laser beam coincides with the recording surface of the magneto-optic disk MOD, and the spot on the photodetector is circular as shown in FIGS. 15(1), (3). In these situations, the outputs from the photodetector regions are equal and the focusing error signal is 0. Immediately after a change-over is made, however, the wavelength varies although the objective lens remains in the same position. The focusing point is therefore displaced by an amount d0 from the recording surface of the magneto-optic disk MOD as shown in FIG. 14(2), the spot on the photodetector becomes elliptical as shown in FIG. 15(2), and a positive or negative focusing error signal is output.

FIG. 16 shows the relation between the focusing error signal and the focusing point of the laser beam. The x axis represents the position of the focusing point of the laser beam, x=0 corresponding to the recording surface of the magneto-optic disk MOD. The y axis on the other hand represents the focusing error signal. The objective lens is adjusted such that the focusing error signal is 0, i.e. such that the focusing point of the laser beam coincides with the recording surface of the magneto-optic disk MOD.

During reproduction, as the power of the laser beam is low, the proportion by which the focusing error signal varies with respect to the displacement of the focusing point of the laser beam is small, so the relation between the two parameters is represented by the line A which has a small slope. On the other hand during recording, as the power of the laser beam is high, the aforesaid proportion is large and so the relation between the two parameters is represented by the line B which has a large slope.

When a change-over is made from reproduction to recording, the focusing point of the laser beam which was at the position shown in (1), is instantaneously displaced to the position shown in (2) due to the variation of wavelength, and then returns to the position shown in (3) due to the movement of the objective lens. The focusing error signal generated by the displacement d0 of the focusing point at the instant of change-over is E0.

FIG. 17 shows the relation between the position of the objective lens (horizontal axis) and the amplitude of the magneto-optic disk signal AP. The amplitude AP of the magneto-optic recording signal is a maximum (level 1 in the figure) when the focusing point of the laser beam coincides with the magneto-optic disk, and it declines along the curves A', B' as the focusing point moves away from the disk. Herein, the curve A' corresponds to the case of reproduction, and the curve B' to the case of recording.

The inflection points on the curves show the positions of the objective lens when the focusing point of the laser beam coincides with the recording surface of the disk. To make the focusing point coincide with the recording surface, the objective lens must be displaced by a distance d0 when a change-over is made from reproduction to recording. When the objective lens is at a point (1) on the curve A' such that the focusing point coincides with the recording surface using the reproduction wavelength, and a change-over is made to the recording wavelength, the amplitude of the magneto-optic recording signal falls to a point (2) on the curve B'. The objective lens is then driven by the focusing servo mechanism such that the focusing point coincides with the recording surface at the point (3) on the curve B' using the recording wavelength, and the amplitude of the magneto-optic recording signal is again a maximum.

FIG. 18 shows the variation of the focusing error signal FE with time, and FIG. 19 shows the variation of amplitude of the magneto-optic recording signal with time. The focusing error signal is E0 due to a change-over from reproduction to recording, and the magneto-optic recording signal falls by an amount corresponding to E0. A change-over time t0 is required for the focusing error signal to return to 0, and for the magneto-optic recording signal to return to its maximum value.

This conventional magneto-optic recording/reproduction apparatus is adjusted so that the focusing error signal is 0 when the focusing point coincides with the optical disk. A large focusing error signal is therefore generated due to the displacement of the focusing point when there is a change-over of the laser wavelength.

A servo mechanism adjusts the objective lens so that the focusing error signal returns to 0. A considerable time is however required until the focusing point coincides with the disk, and during this time the level of the disk signal may fall so that accurate recording and reproduction are not possible.

SUMMARY OF THE INVENTION

It is therefore an object of this invention to provide a magneto-optic recording/reproduction apparatus wherein deterioration of the magneto-optic recording signal is small, and which records and reproduces information accurately when the wavelength of the optical source varies.

The magneto-optic recording/reproduction apparatus of this invention adds a predetermined offset voltage to the focusing error signal produced by the output signal of the photodetector, and is arranged so as to minimize the variation of focusing error signal due to variation of optical source wavelength. The objective lens is driven in the direction of its optic axis based on the focusing error signal to which the offset has been added so that this signal is 0.

DETAILED DESCRIPTION OF THE EMBODIMENTS

The embodiment of the present invention will now be described hereinafter with reference to the drawings.

FIGS. 1 to 8 illustrate a first embodiment 1 wherein this invention is applied to an information recording and reproduction apparatus using an magneto-optic disk.

The overall construction of an optical system will first be described.

Figure 1:
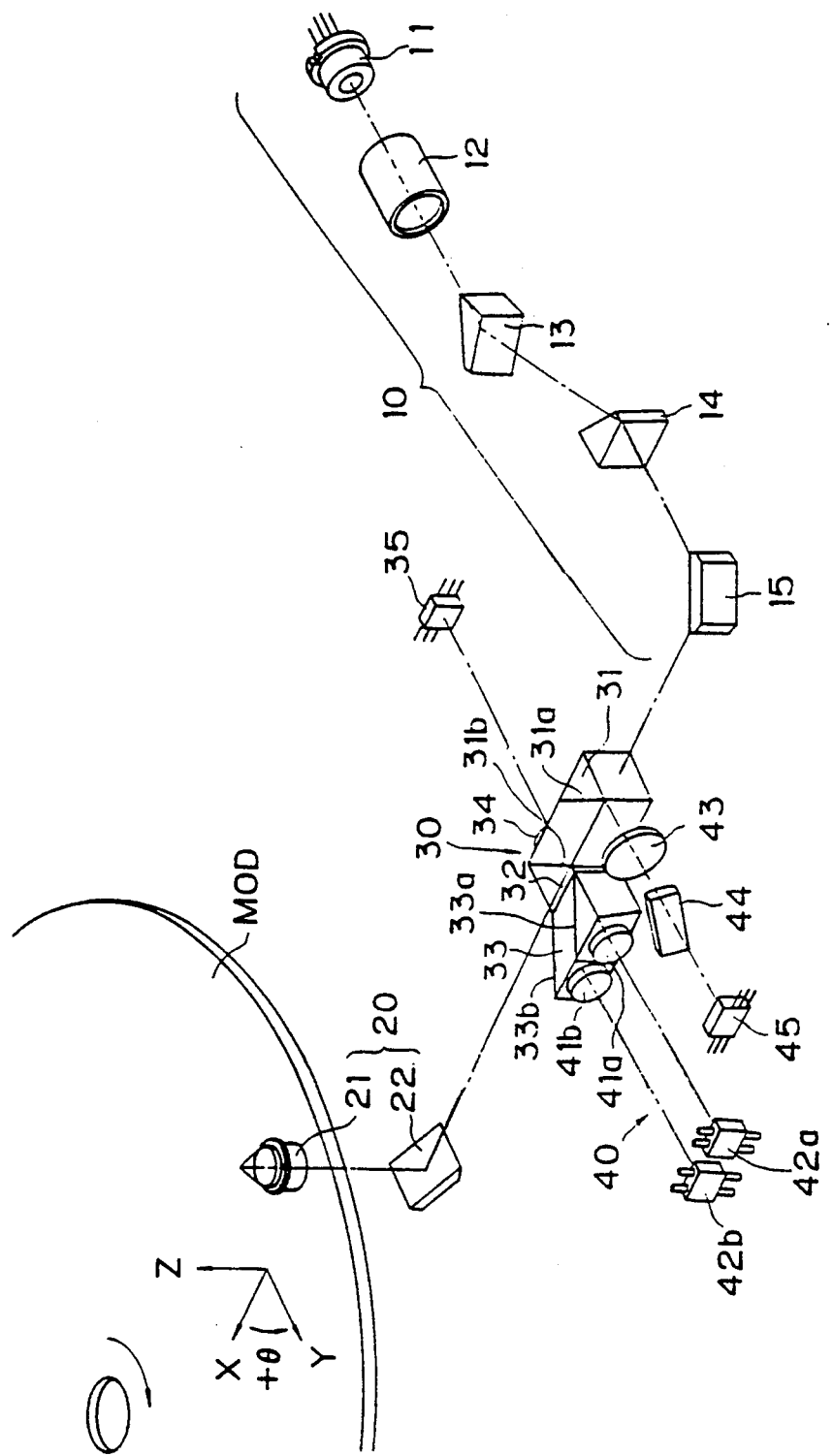
FIG. 1 is a schematic diagram showing the arrangement of the whole optical system of the magneto-optic recording/reproduction apparatus of embodiment 1.

In this optical system, as shown in FIG. 1, there are provided a light source unit 10, an objective optical system 20, a prism block 30 and a signal detecting optical system 40 are provided. The light source unit 10 comprises a semiconductor laser 11 generating a divergent light beam, a collimator lens 12 for converting the divergent light beam to a parallel light beam, two anamorphic prisms 13, 14 for shaping the sectional shape of the light beam, and a mirror 15. This light source unit 10 generates a parallel beam of circular cross-section.

The objective optical system 20 comprises an objective lens 21 which converges a light beam on the signal recording surface of an magneto-optic disk MOD which is reflected by mirror 22. The objective lens 21 and mirror 22 are installed in a head, not shown, which is free to slide in the radial direction of the magneto-optic disk MOD. On the other hand, the light source unit 10, the prism block 30 and the signal detecting optical system 40 are fixed. Further, the objective lens 21 is installed on an actuator located in the head (not shown) so that it can be driven in the direction z of the optic axis.

The prism block 30 comprises a first block 31 having two half mirror surfaces 31a, 31b, and a second block 33 having a polarizing separating surface 33a and a full reflecting surface 33b joined to first block 31 via a half wavelength plate 32.

The light beam from the light source unit 10 is partly reflected by the second half mirror surface 31b, and is condensed by a condensing lens 34 on a photodetector 35 for automatic regulation of the output of the semiconductor laser.

Part of the light beam reflected by the magneto-optic disk MOD is also reflected by the second half mirror surface 31b, and its polarization direction is rotated by 45° by the half wavelength plate 32. A P component passes through a polarization splitting surface 33a, and then via a condensing lens 41a to be condensed on a first photodetector 42a for detecting a magneto-optically recorded signal. An S component, on the other hand, is reflected by the polarization splitting surface 33a and the full reflecting surface 33b, and passes via a condensing lens 41b to be condensed on a second photodetector 42b for detecting a magneto-optically recorded signal.

As the polarization direction of the laser beam incident on the magneto-optic disk MOD is rotated by a magnetic Kerr effect corresponding to the magnetization direction of the optical disk at the position where the spot forms an image, the recorded signal can be read by rotating the laser beam by 45° as described above, splitting it into two components P, S, and detecting these components by means of the separate photodetectors 42a, 42b so as to determine the intensity difference between them.

A component of the reflected light from the magneto-optic disk MOD that passes through the second half mirror 31b is reflected by the first half mirror 31a, and condensed on a photodetector 45 for detecting the focusing error signal via a condenser lens 43 and a cylindrical lens 44.

Figure 2:
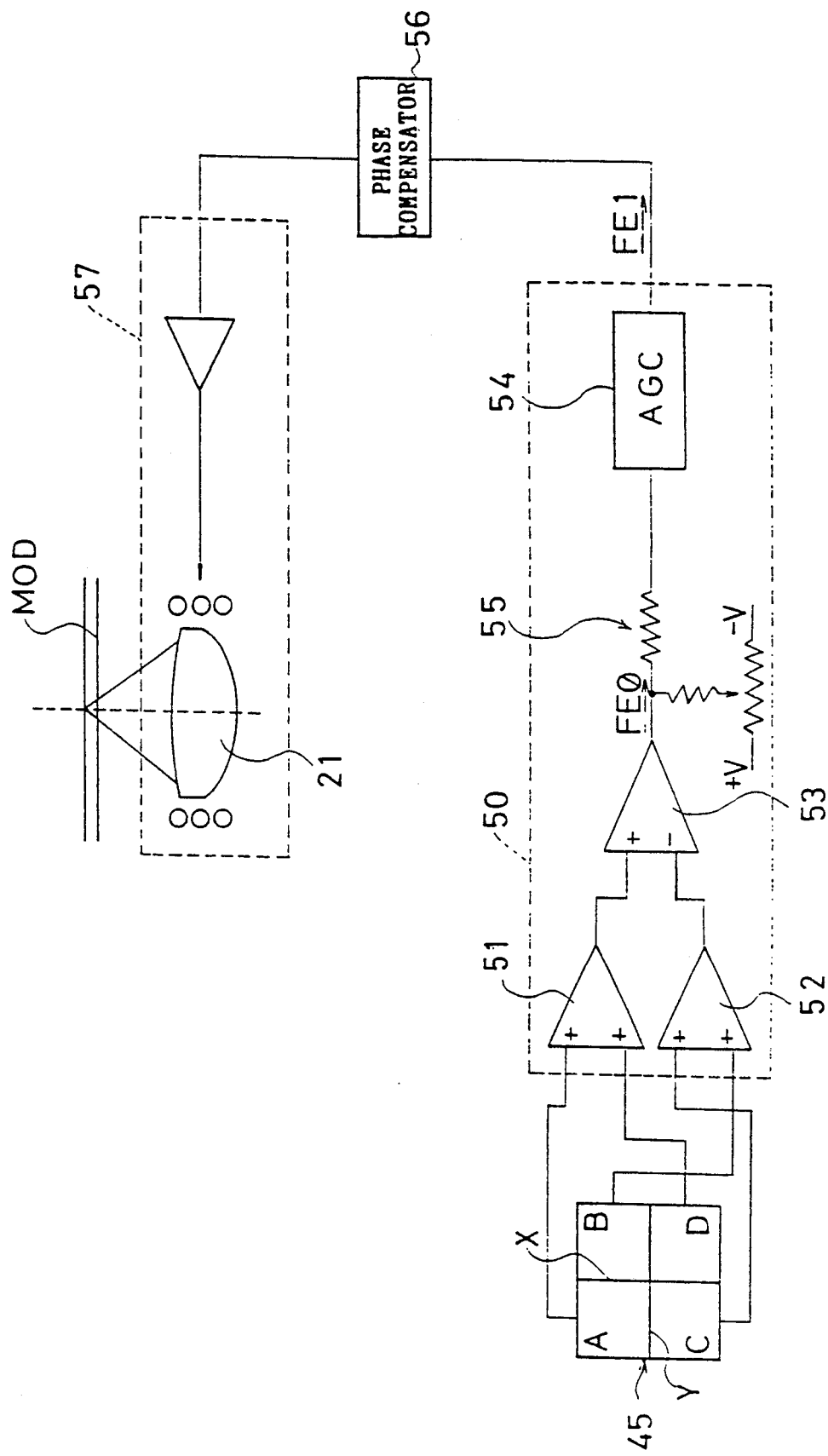
FIG. 2 is a block drawing showing the focusing control system of embodiment 1.

As shown in FIG. 2, the error detection photodetector 45 comprises four detecting regions A, B, C, D divided by an axis X corresponding to the radial direction, and an axis Y corresponding to the tangential direction, of the disk.

The focusing error detection circuit 50 comprises two adders 51, 52 for summing the outputs from diagonally opposite detecting regions of the photodetector 45, a subtractor 53 for calculating the difference in the outputs of these adders, an offset adjusting circuit 55 for adding an offset to the output of the subtractor 53, and an auto gain control circuit 54 for adjusting the output level of the offset adjusting circuit.

If the voltages corresponding to the detecting regions of the photodetector are represented by the symbols for these regions, the original focusing error signal output by the subtractor 53 may be expressed by:

$$FE0 = (A+D) - (B+C)$$

The focusing error signal FE1 output by the AGC circuit 54 when an offset $\delta$ is added, is expressed by:

$$FE1 = FE0 + \delta = (A+D) - (B+C) + \delta$$

The offset $\delta$ is set such that during reproduction, the focusing point using the reproduction wavelength and the focusing point using the recording wavelength are respectively situated on the objective lens side and the opposite side of the recording surface of the magneto-optic disk. The added offset $\delta$ is moreover such that the focusing error signal FE1 is 0 when the focusing points during recording and reproduction do not coincide with the recording surface of the disk.

After a phase compensation has been added by a phase compensator 56 to the output focusing error signal FE1, the signal is supplied to an actuator 57. Based on this signal, the actuator 57 drives the objective lens 21 such that FE1 is 0.

It is assumed that the diameter of the laser beam spot on the disk is kept within a certain limit so that recording and reproduction are performed accurately. It is therefore necessary that the displacement of the focusing point from the disk caused by the offset during reproduction and recording is within a focusing depth (range) such that the spot diameter can be kept within this limit.

The focusing adjustment in the embodiment having the aforesaid construction will now be described with reference to FIGS. 3-8. In the figures, (1) indicates reproduction, (2) indicates the situation immediately after a change-over is made from reproduction to recording, and (3) indicates recording.

First, the positional relationship between the objective lens and the disk, and the shape of the spot on a photodetector for detecting the focusing error, will be described with reference to FIGS. 3 and 4.

Figure 3:
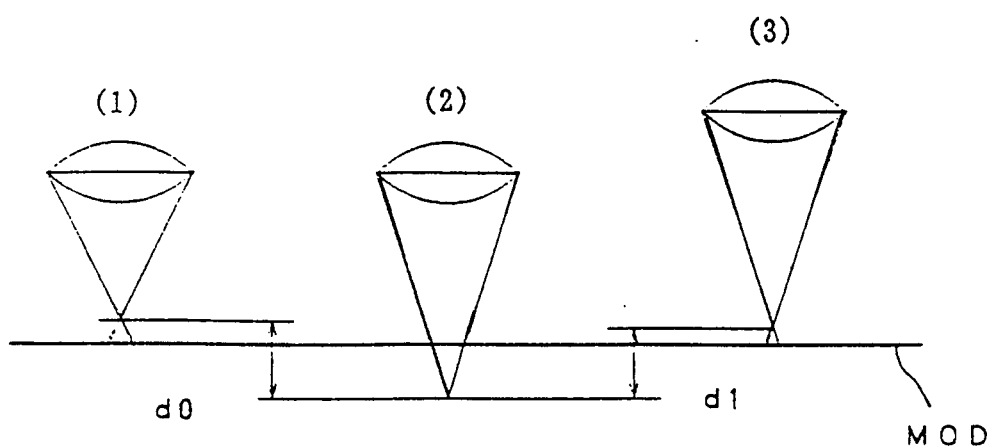
FIG. 3 is a schematic drawing showing the positional relationship of the objective lens and disk in embodiment 1.
Figure 4:
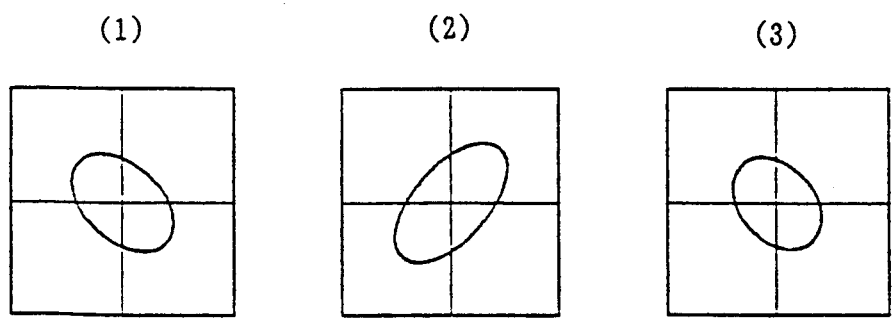
FIG. 4 is a schematic drawing showing the shape of the spot on the photodetector at each point in embodiment 1.

During reproduction, the focusing point of the laser beam is on the objective lens side of the recording surface of the magneto-optic disk MOD as shown in FIG. 3(1), and the shape of the spot on the photodetector is elliptical as shown in FIG. 4(1).

Immediately after a change-over is made from reproduction to recording, however, as the objective lens is in the reproduction position and the wavelength changes to the recording wavelength, the focusing point of the laser beam is displaced by d0 from the position (1) as shown in FIG. 3(2), and the spot on the photodetector becomes an ellipse of small eccentricity having opposite phase to that shown in (1) as shown in FIG. 4(2).

During recording, the focusing point of the laser beam is at a predetermined distance from the disk surface as shown in FIG. 3(3), and the spot on the photodetector is an ellipse of large eccentricity having the same phase as that shown in 4(3).

Figure 5:
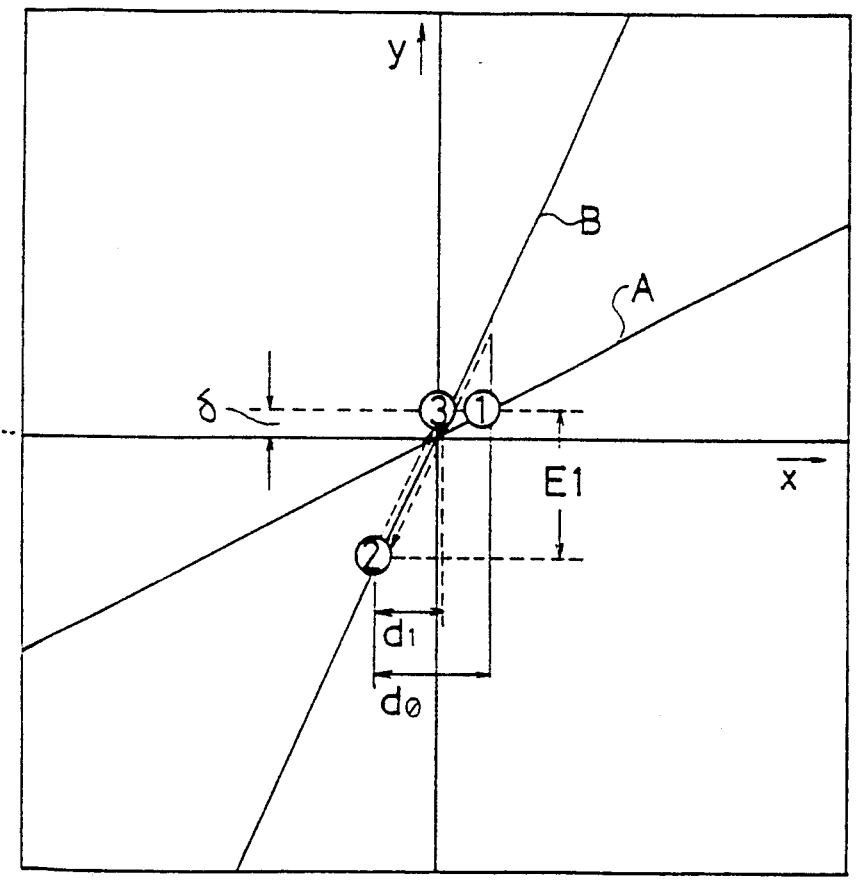
FIG. 5 is a characteristic diagram showing the relationship between the level of the focusing error signal and the position of the focusing point of the laser beam during recording and reproduction in embodiment 1.

Next, the relation between the level of the original focusing error signal FE0 and the position of the focusing point of the laser beam will be described with reference to FIG. 5. In the figure, the x axis represents the position of the focusing point of the laser beam along the optical axis, and the point x=0 corresponds to the recording surface of the disk. Further, the y axis represents the original focusing error signal FE0, and the point y=0 corresponds to when the original focusing error signal FE0 is 0, i.e. to when the focusing error signal FE1 is $+\delta$. The objective lens is controlled such that the focusing error signal FE1 is 0, i.e. such that the position of the focusing point of the laser beam is displaced by an amount corresponding to an offset $\delta$ from the recording surface of the disk.

During reproduction, as the power of the laser beam is low, the proportion by which the focusing error signal varies with respect to the displacement of the focusing point of the laser beam is small, so the relation between the two parameters is represented by the line A which has a small slope. On the other hand during recording, as the power of the laser beam is high, the aforesaid proportion is large and so the relation between the two parameters is represented by the line B which has a large slope. If an offset $\delta$ is added to the original focusing error signal FE0, therefore, the focusing point (1) during reproduction is further from the disk than the focusing point (3) during recording.

The focusing point of the laser beam which is in the position (1) during reproduction, is instantaneously displaced to the position shown in (2) due to a wavelength variation when a changeover is made from reproduction to recording. The objective lens is then moved by the focusing servo mechanism so that the focusing point returns to the position (3). The focusing error signal FE1 produced by a displacement d0 of the focusing point when the changeover is made, is E1 (<E0).

Further, the displacement of the focusing point from the changeover time (2) to recording (3), is d1 (<d0).

Insofar as concerns reproduction, information can still be obtained even if an error occurs by repeating the reproduction process. On the other hand, if information is incorrectly recorded, it is impossible to judge whether or not the information is incorrect without reproducing it. Higher precision is therefore required during recording than during reproduction. To provide reliable reproduction and recording, the diameter of the laser beam spot on the disk must be limited, and it is therefore particularly desirable that the focusing point is near the disk during recording. In embodiment 1, due to the addition of the offset δ, the focusing point is nearer the recording surface of the magneto-optic disk during recording than it is during reproduction, and the aforesaid requirement is therefore satisfied.

Figure 6:
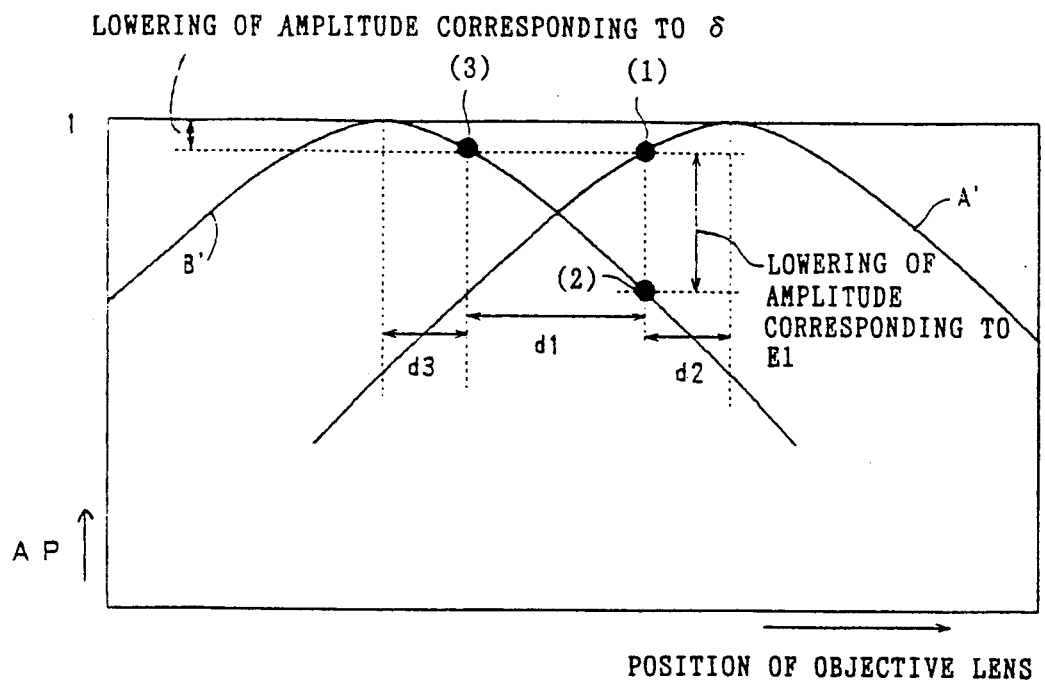
FIG. 6 is a graph showing the relationship between the position of the objective lens and the amplitude of the magneto-optic recording signal in embodiment 1.

FIG. 6 shows the relation between the position of the objective lens (horizontal axis) and the amplitude AP of the magneto-optic recording signal (vertical axis). The amplitude AP of the magneto-optic recording signal is a maximum (level 1 in the figure) when the position of the focusing point of the laser beam coincides with the disk, and it decreases along the curves A', B' when the position of the focusing point is displaced in front of and behind the disk. Herein, the curve A' corresponds to the case of reproduction, and the curve B' to the case of recording. The inflection points on the curves show the positions of the objective lens when the magneto-optic recording signal is a maximum.

The distance from the position of the offset objective lens during reproduction to the position at which the amplitude of the magneto-optic recording signal is a maximum during reproduction, is d2, and the distance from the position of the offset objective lens during recording to the position at which the amplitude of the magneto-optic recording signal is a maximum during recording, is d3.

When performing a change-over to recording ((2)–(3)), the objective lens must be moved through a distance d1.

When the objective lens is in the reproduction position (1) and the wavelength is changed to the recording wavelength, the amplitude of the magneto-optic recording signal falls towards the lower part of the figure to a point (2) on the curve B'. The objective lens is then driven by the action of the focusing servo circuit along the curve B' to the recording point (3) such that the focusing error signal FE1 is 0.

Figure 7:
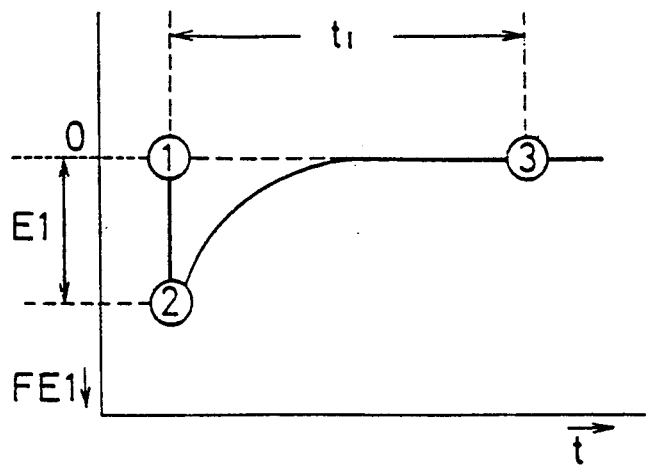
FIG. 7 is a graph showing the variation of the focusing error signal with time in embodiment 1.
Figure 8:
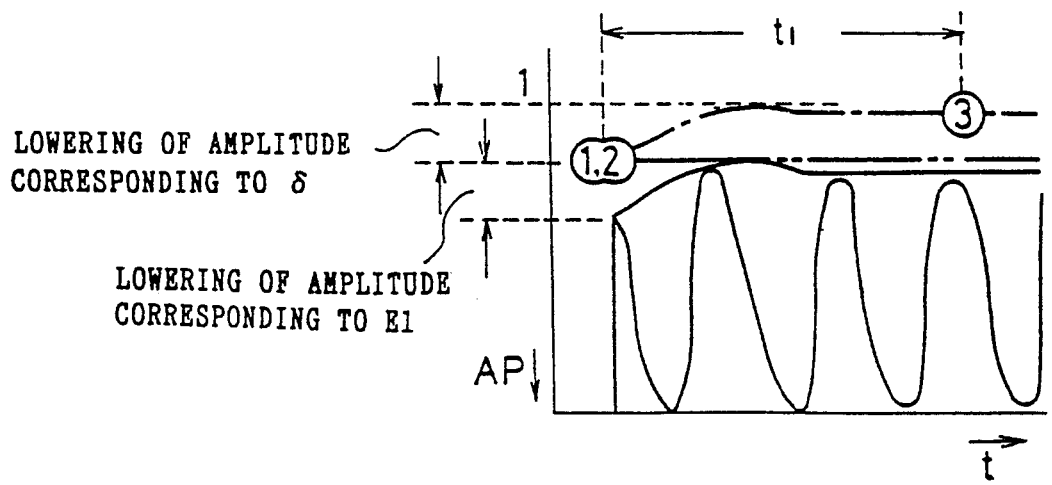
FIG. 8 is a graph showing the amplitude variation of the magneto-optic recording signal with time in embodiment 1.

FIG. 7 shows the variation of the aforesaid focusing error signal FE1 with time, and FIG. 8 shows the variation of the amplitude AP of the magneto-optic recording signal with time.

In this embodiment, the focusing point of the laser beam is displaced towards the objective lens in the direction of its optic axis by an amount corresponding to the offset δ.

Although this causes a slight reduction of signal level, the position of the focusing point is nearer the disk during recording than during reproduction, so there is less deterioration of the signal level due to the offset during recording (shown by a single dot line in the figure) than during reproduction (shown by the two dot line in the figure).

Further, when a change-over is made from reproduction to recording, the focusing error signal FE1 becomes E1, and the magneto-optic recording signal level falls by an amount corresponding to E1. The time t1 required from the change-over until the focusing error signal returns to 0 and the magneto-optic recording signal reaches its maximum value, is however shorter than if there were no offset δ.

There is therefore little signal deterioration when a wavelength change-over occurs, and recording can begin in the relatively short time t1 after the changeover.

Further, in embodiment 1, the situation was described wherein a constant offset was given to the original focusing error signal during reproduction and recording so that the focusing point did not coincide with the recording surface of the disk in either case. It is however possible to give the original focusing error signal an offset only during reproduction, the focusing point and the recording surface being made to coincide during recording.

In a second embodiment 2, the offset given to the focusing point is variable.

This embodiment of the invention will be described with reference to FIGS. 9–13. The construction of the optical system is the same as that of embodiment 1, and will therefore be omitted.

Figure 9:
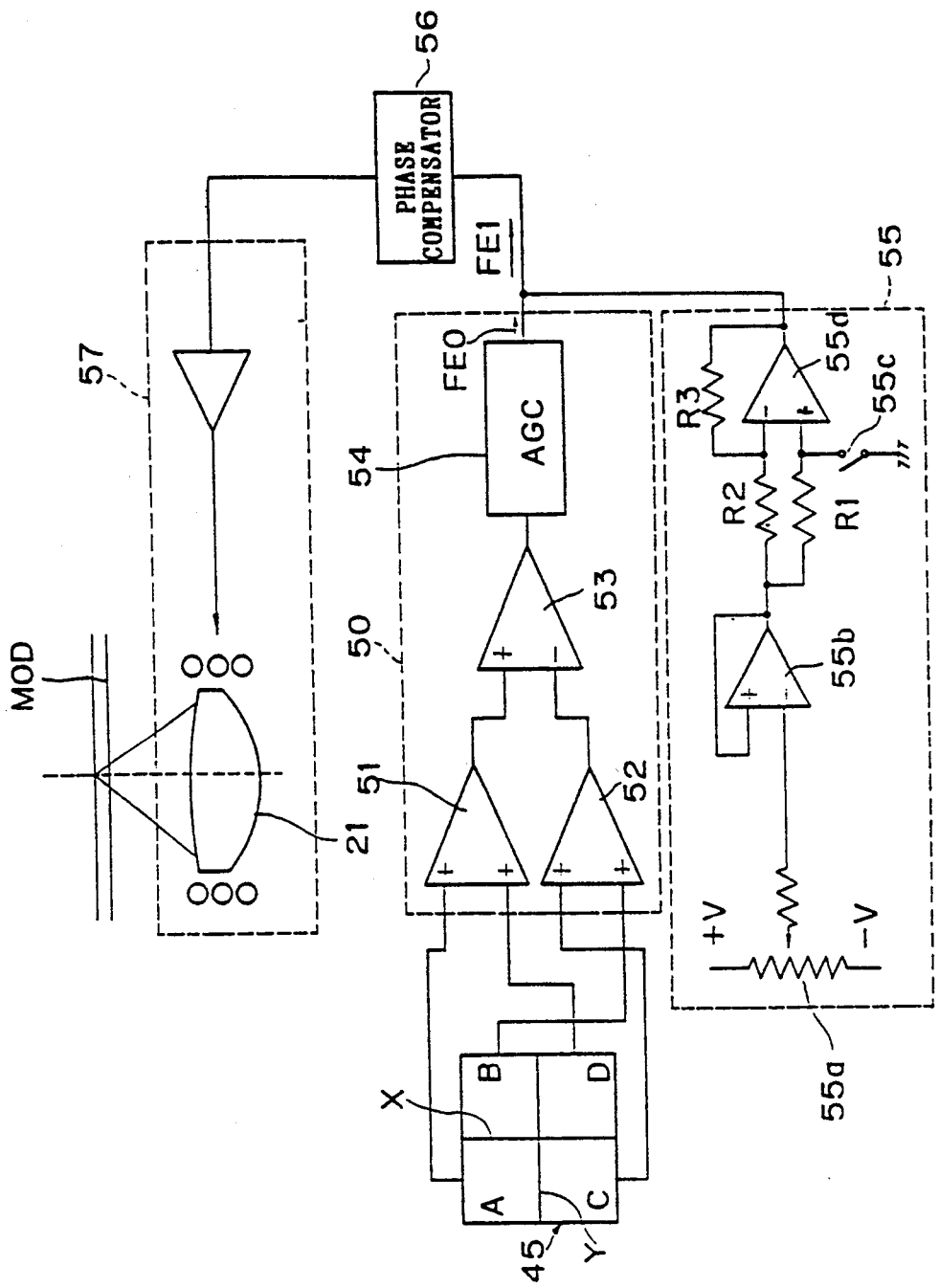
FIG. 9 is a circuit diagram showing the control system of the magneto-optic recording/reproduction apparatus of embodiment 2.

As shown in FIG. 9, an error detection photodetector 45 comprises four detecting regions A, B, C, D divided by an X axis corresponding to the radial direction, and a Y axis corresponding to the tangential direction.

A focusing error detection circuit 50 comprises two adders 51, 52, a subtractor 53, and AGC circuit 54 and an offset adjusting circuit 55.

The offset adjusting circuit 55 comprises a variable resistor 55a for setting an offset level reference voltage by dividing the value of the resistance between +V and −V. a buffer amplifier 55b, and an operational amplifier 55d which reverses the polarity of the output voltage from this buffer amplifier 55b depending on the state of a switch 55c. A resistor R1 is connected to non-reversing input terminals of the operational amplifier, and a resistor R2 and feedback resistor R3 are connected to reversing input terminals, the values of at least the resistors R2 and R3 being the same.

The switch 55c is switched ON during recording, (i.e., when the wavelength of the semiconductor laser 11 is long), and it is switched OFF during reproduction (i.e., when the Wavelength is short). When the switch 55c is OFF, the output voltage E of the buffer amplifier 55b is applied as an output voltage δ (=E) without modification. When the switch 55c is ON, the non-reversing terminals of the operational amplifier 55d are connected to GND, and a voltage −E having a reversed polarity is applied. Further, the ON and OFF positions of the switch 55c are not necessarily as described hereintofore, and they may also be reversed according to the setting of the reference voltage and the orientation of the cylindrical lens.

If the voltages corresponding to the detecting regions of the photodetector are represented by the symbols for these regions, the original focusing error signal FE0 output by the substractor 53 can be expressed by:

$$FE0 = (A+D) - (B+C)$$

The focusing error signal FE1 input to the phase compensator circuit 56 when an offset δ is added, is expressed by:

$$FE1 = FE0 + \delta = (A+D) - (B+C) + \delta$$

Next, the action of the aforesaid magneto-optic recording/reproduction apparatus will be described with reference to FIG. 10. When the light beam is brought to a focus on the magneto-optic disk MOD by the objective lens 21, the focusing point using a short wavelength is P1 and P2 using a long wavelength due to chromatic aberration of the objective lens. In the apparatus of this embodiment, the gain of the focusing error signal is adjusted to the same level by the AGC circuit 54 for both long and short wavelengths, an offset voltage $\delta$ is added to this signal, and the signal is input to the phase compensator circuit 56.

Figure 10:
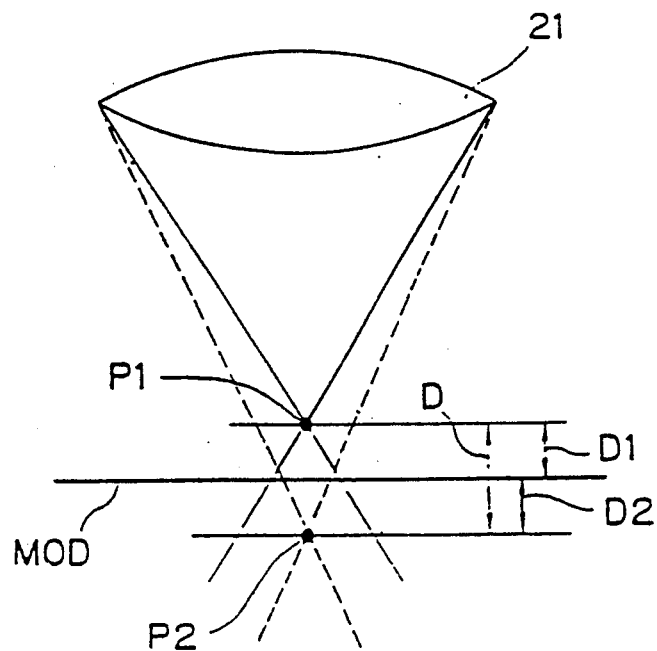
FIG. 10 is a schematic diagram showing the action of the magneto-optic recording/reproduction apparatus of embodiment 2.

The offset adjusting circuit 55 adds an offset voltage $\delta$ such that D1=D2=D/2, wherein D is the distance between the focusing point P1 during recording and the focusing point P2 during reproduction, D2 is the distance between the focusing point and the disk during recording, and D1 is the distance between the focusing point and the disk during reproduction (as shown in FIG. 10). In other words the focusing error signal FE1 is 0 when the focusing point during reproduction is situated closer to the objective lens 21 than the disk by a distance D/2.

Figure 11:
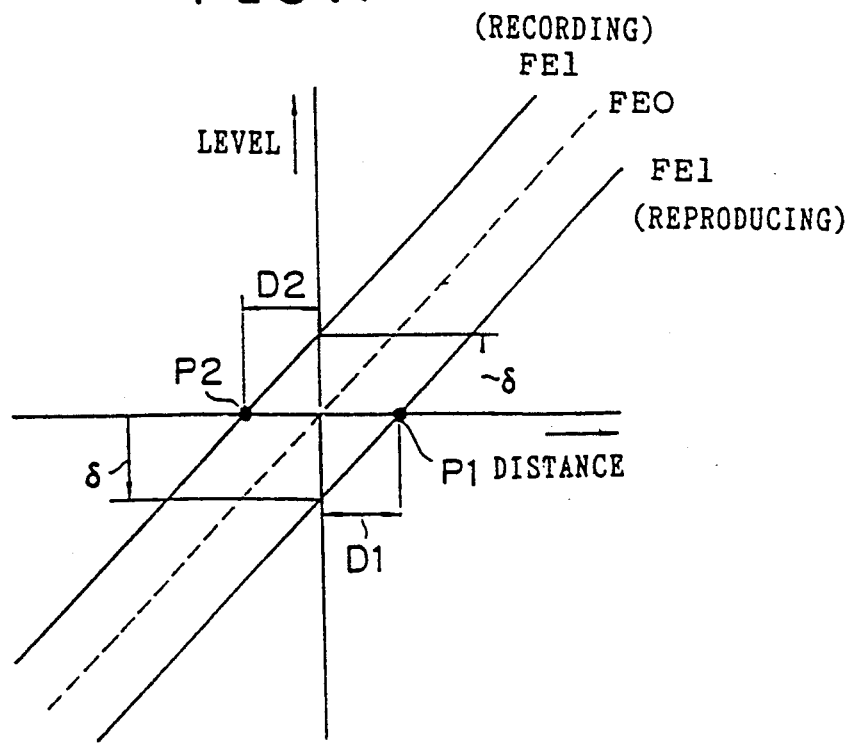
FIG. 11 is a graph showing the focusing error signal of the magneto-optic recording/reproduction apparatus of embodiment 2.

With this setting, the focusing error signal FE1 input to the phase compensator 56 is 0 during reproduction when the focusing point is situated closer to the objective lens than the disk by a distance D/2, as shown in FIG. 11, and is 0 during recording when the focusing point is further from the objective lens than the disk by a distance D/2. In this graph, the distance to the focusing point from the objective lens is represented by a horizontal coordinate with the disk as origin, and the focusing error signal level is represented by a vertical coordinate which increases as the focusing point approaches the objective lens 21.

If the added offset voltage $\delta$ is reversed corresponding to the change-over between recording and reproduction, the focusing error signal FE1 will be 0 even if the objective lens is not moved. Stable recording/reproduction is therefore possible without moving the lens when a change-over is made.

Next, two examples of processing will be described when the detection circuit 50 does not comprise the AGC circuit 54, or when the AGC circuit is provided at a later stage than the offset adjusting circuit. In this case, as the laser power is different during recording and during reproduction, the relationship between the focusing error signal FE0 and the distance of the focusing point from the disk may be expressed by two straight lines having different slopes as shown by the broken lines in FIG. 12.

Figure 12:
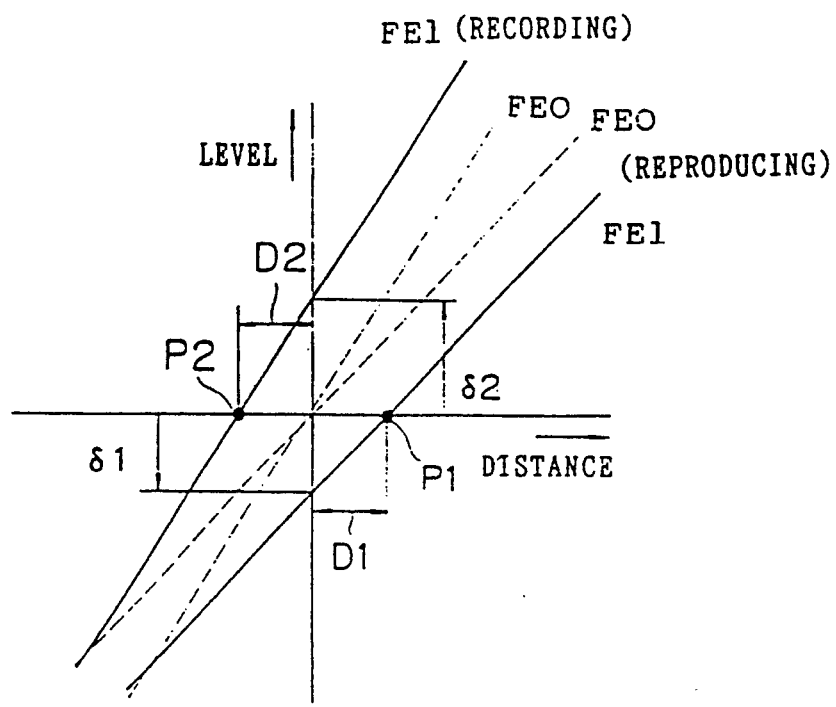
FIG. 12 is a graph showing an example of offset addition when a gain control circuit is not provided.

In the example of FIG. 12, the values of the resistors R2, R3 are adjusted so as to vary not only the polarity of the offset voltages $\delta 1$, $\delta 2$, but also the absolute value of the signal when a wavelength change-over is made. By combining resistors, the distance D2 between the focusing point and the disk during recording, and the distance D1 between the focusing point and the disk during reproduction, may be adjusted or set such that D1=D2=D/2 as shown in the example of FIG. 11.

Figure 13:
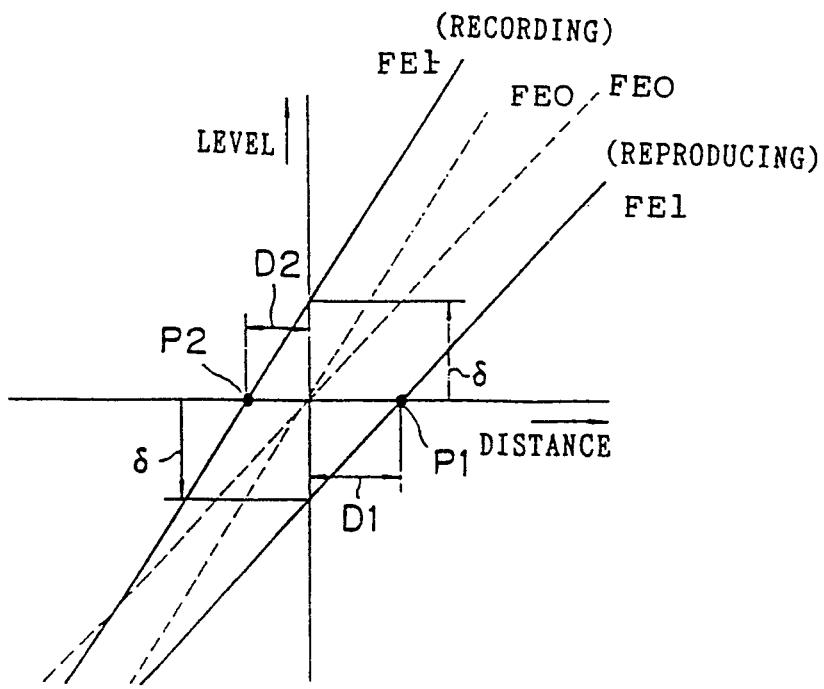
FIG. 13 is a graph showing another example of offset addition when a gain control circuit is not provided.
Figure 14:
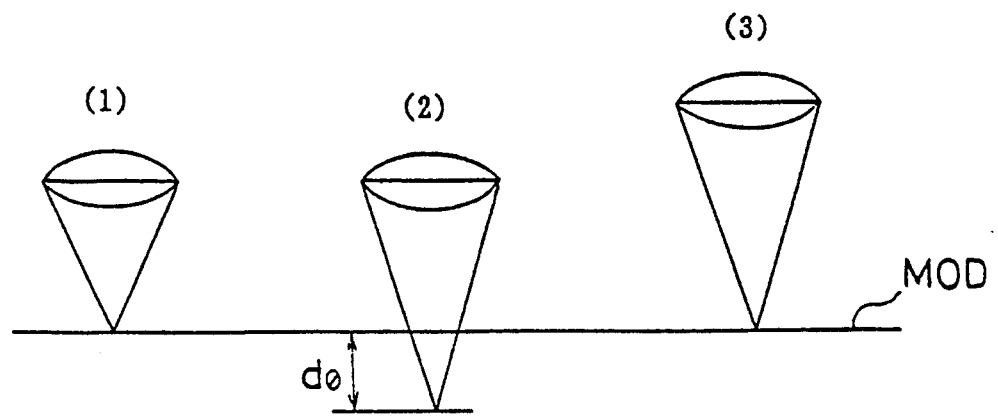
FIG. 14 is a schematic diagram showing the positional relationship of the objective lens and disk in a conventional magneto-optic recording/reproduction apparatus.
Figure 15:
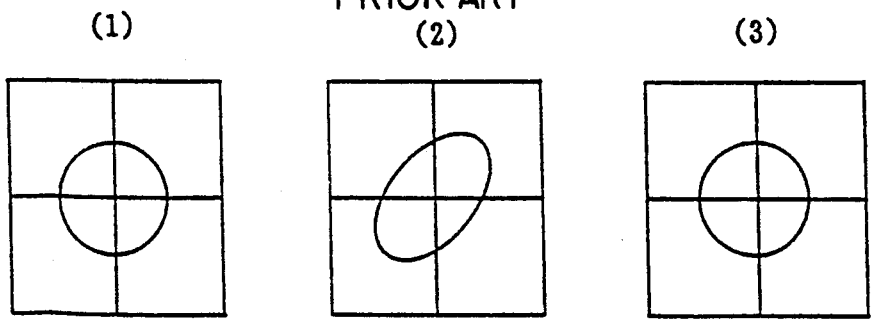
FIG. 15 is a schematic drawing showing the shape of the spot on the photodetector at each point in a conventional apparatus.
Figure 16:
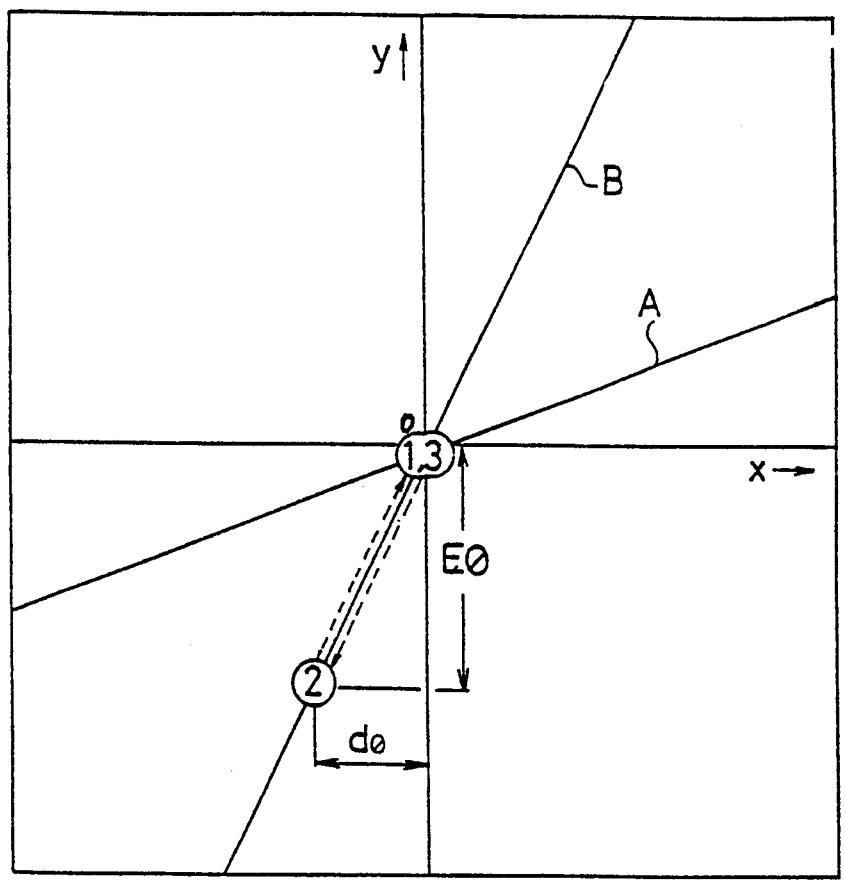
FIG. 16 is a characteristic diagram showing the relationship between the level of the focusing error signal and the position of the focusing point of the laser beam during recording and reproduction in a conventional apparatus.
Figure 17:
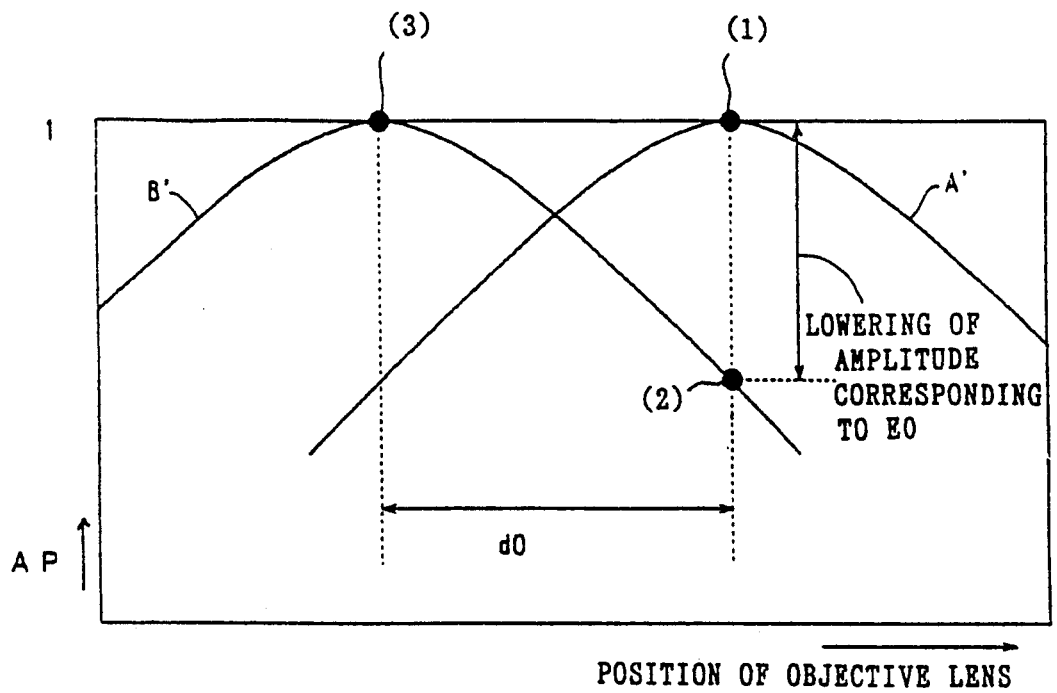
FIG. 17 is a graph showing the relationship between the position of the objective lens and the amplitude of the magneto-optic recording signal in a conventional apparatus.
Figure 18:
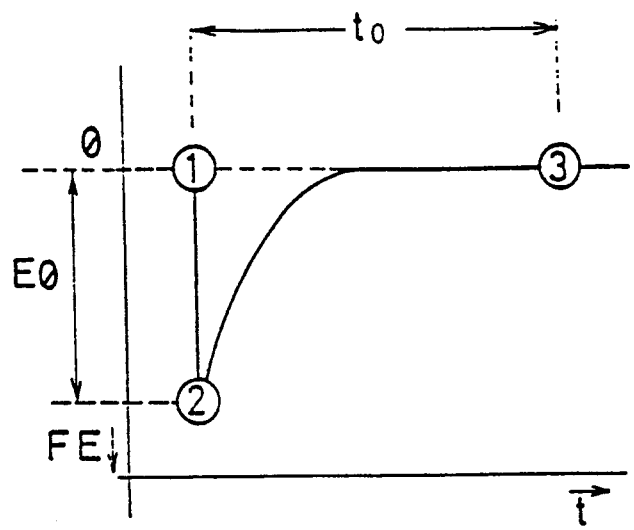
FIG. 18 is a graph showing the variation of the focusing error signal with time in a conventional apparatus.
Figure 19:
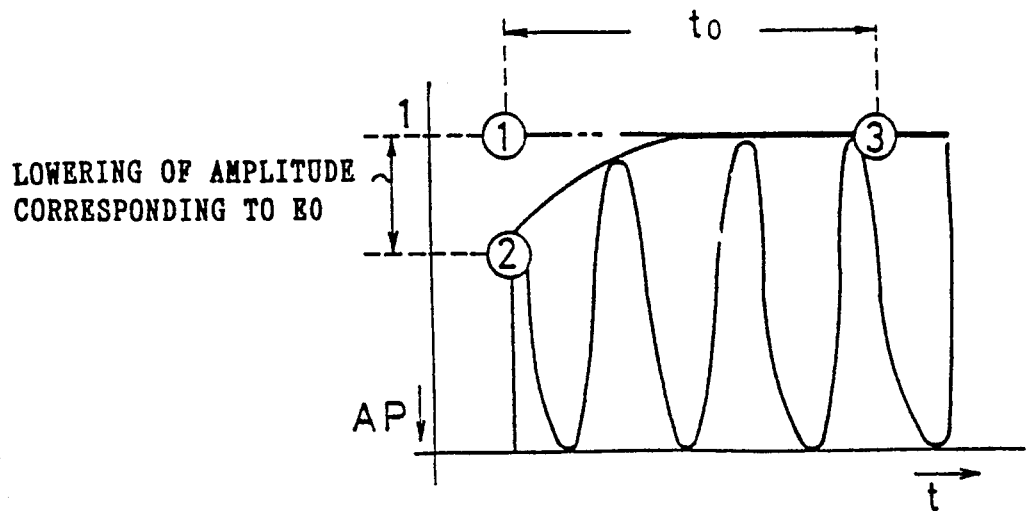
FIG. 19 is a graph showing the variation of the magneto-optic recording signal with time in a conventional apparatus.

In the example of FIG. 13, only the polarity of the offset voltage is changed as in the example of FIG. 11. It is not necessary to set the distance of the focusing point from the disk to be equal during recording and reproduction, and the distance D2 of the focusing point from the disk during recording may be set to be smaller than the distance D1 of same during reproduction as shown in FIG. 13.

In embodiment 2, the distances from the focusing points P1, P2 to the disk must be limited to an extent that the decline of amplitude does not interfere with signal detection, and the embodiment cannot be applied if the distance D through which the focusing point is displaced, which is determined by the wavelength difference when a change-over is made and by the chromatic aberration of the objective lens, is too great. In such a case, the embodiment can be applied if the chromatic aberration of the objective lens is corrected to some extent, and the displacement distance D is decreased.

In the aforesaid two embodiments, examples were described where focusing error detection was performed by the astigmatism method, but they can also be applied to the knife edge method and to the spot size method.

What is claimed is:

1. A mechanism for use with a magneto-optic recording/reproduction apparatus, said mechanism comprising:
   a laser light source for emitting a light beam of variable wavelength;
   an objective lens for converging said light beam on an optical disk;
   focusing error detection means for receiving a light beam reflected by said optical disk and for producing a focusing error signal;
   offset adjusting means for adding a predetermined offset voltage to said focusing error signal; and
   drive means for driving said objective lens in the direction of an optical axis of said objective lens, based on said focusing error signal to which said offset voltage has been added by said offset adjusting means;
   said offset adjusting means comprising means for reversing the polarity of the offset voltage in accordance with a change in the wavelength of said light beam emitted by said laser light source.

2. A mechanism for use with a magneto-optic recording/reproduction apparatus comprising:
   a laser light source for emitting a light beam of variable wavelength;
   an objective lens for converging said light beam on an optical disk;
   focusing error detection means for receiving a light beam reflected by said optical disk and for producing a focusing error signal;
   offset adjusting means for adding a predetermined offset voltage to said focusing error signal; and
   drive means for driving said objective lens in the direction of its optical axis, based on said focusing error signal to which said offset voltage has been added by said offset adjusting means,
   wherein said offset adjusting means further comprises means for applying said offset voltage such that a signal, which is output after said predetermined offset voltage is added to said focusing error signal, is 0 when the focusing point of the light beam, during reproduction, is situated closer to said objective lens than to said optical disk, and for applying an offset voltage having an equivalent absolute value and a reversed polarity to said focusing error signal during recording.

3. A mechanism for use with a magneto-optic recording/reproduction apparatus, said mechanism comprising:
   a laser light source for emitting a light beam of variable wavelengths;
   an objective lens for converging said light beam on an optical disk;
   focusing error detection means for receiving a light beam reflected by said optical disk, and for producing a focusing error signal;
   offset adjusting means for adding a predetermined offset voltage to said focusing error signal, during both recording and reproduction operations;
   drive means for driving said objective lens in the direction of the objective lens optical axis, based on said focusing error signal to which said offset voltage has been added by said offset adjusting means; and
   said offset adjusting means comprising means for providing an adjusted signal such that said optical disk is situated between the focusing point for a first wavelength of said light beam and a focusing point for a second wavelength of said light beam.

4. A mechanism for use with a magneto-optic recording/reproduction apparatus, said mechanism comprising:
   a laser light source for emitting a light beam of variable wavelength;
   an objective lens for converging said light beam, on an optical disk;
   focusing error detection means for receiving a light beam reflected by said optical disk, and for producing a focusing error
   offset adjusting means for adding a predetermined offset voltage to said focusing error signal, said offset adjusting means comprising means for adding said predetermined offset voltage to said focusing error signal during both recording and reproducing operations;
   automatic gain control means for controlling a gain of said focusing error signal, to which said predetermined offset voltage has been added by said offset adjusting means, to form an output signal;
   drive means for driving said objective lens in the direction of the optical axis of said objective lens, based upon said output signal, wherein said offset voltage is set in order to minimize variations in said focusing error signal when the wavelength of the light beam emitted by said laser light source changes;
   wherein said objective lens is located so that a focusing position of said light beam is nearer with respect to said optical disk during a recording operation, than during a reproduction operation.

5. A mechanism for use with a magneto-optic recording/reproduction apparatus according to claim 4, wherein said offset adjusting means applies a constant offset voltage independent of the wavelength of said laser light source.

6. A mechanism for use with a magneto-optic recording/reproduction apparatus, said mechanism comprising:
   a laser light source for emitting a light beam of variable wavelength;
   an objective lens for converging said light beam on an optical disk;
   focusing error detection means for receiving a light beam reflected by said optical disk, and for producing a focusing error signal;
   offset adjusting means for adding a predetermined offset voltage to said focusing error signal, wherein said offset adjusting means reverses the polarity of the offset voltage in accordance with the wavelength of said laser light source; and
   drive means for driving said objective lens in a direction along the optical axis of said objective lens, based upon said focusing error signal to which said offset voltage has been added;
   wherein said offset adjusting means comprises means for varying said offset voltage in accordance with said wavelength of said laser light source, said offset voltage always having a non-zero value, said offset voltage being set so as to minimize variations in said focusing error signal when said wavelength of said light beam emitted by said laser light source changes.

7. A mechanism for use with a magneto-optic recording/reproduction apparatus, said mechanism comprising:
   a laser light source for emitting a light beam of variable wavelength;
   an objective lens for converging said light beam on an optical disk;
   focusing error detection means for receiving a light beam reflected by said optical disk, and for producing a focusing error signal;
   offset adjusting means for adding a predetermined offset voltage to said focusing error signal, wherein said offset adjusting means reverses the absolute value of the applied offset voltage in accordance with the wavelength of said laser light source; and
   drive means for driving said objective lens in a direction along the optical axis of said objective lens, based upon said focusing error signal to which said offset voltage has been added;
   wherein said offset adjusting means comprises means for varying said offset voltage in accordance with said wavelength of said laser light source, said offset voltage always having a non-zero value, said offset voltage being set so as to minimize variations in said focusing error signal when said wavelength of said light beam emitted by said laser light source changes.

* * * * *

UNITED STATES PATENT AND TRADEMARK OFFICE
CERTIFICATE OF CORRECTION

PATENT NO. : 5,297,114
DATED : March 22, 1994
INVENTOR(S) : Tsuyoshi ITOH et al.

It is certified that error appears in the above-indentified patent and that said Letters Patent is hereby corrected as shown below:

At column 11, line 33 (claim 4, line 10) insert ---signal:--- after "error".

Signed and Sealed this

Twenty-ninth Day of August, 1995

Attest:

BRUCE LEHMAN

Attesting Officer     Commissioner of Patents and Trademarks